P. AMMERMAN.
Harvester Rake.
No. 83,355.
Patented Oct. 27, 1868.
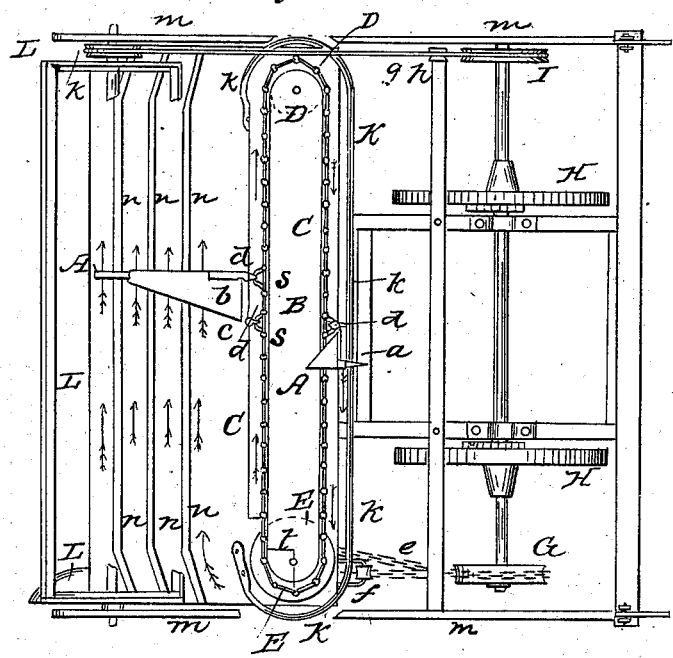
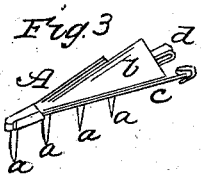
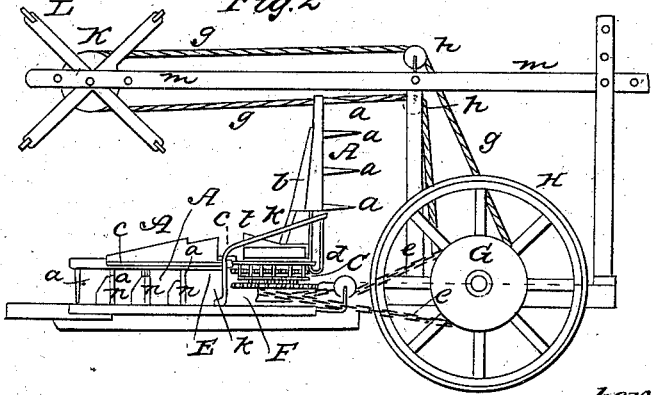

UNITED STATES PATENT OFFICE.

PHILIP AMMERMAN, OF CYNTHIANA, KENTUCKY.

IMPROVEMENT IN HARVESTER-RAKES.

Specification forming part of Letters Patent No. 83,355, dated October 27, 1868.

*To all whom it may concern:*

Be it known that I, PHILIP AMMERMAN, of Cynthiana, Harrison county, State of Kentucky, have invented a new and useful Improvement in Rakes for Reaping-Machines; and I do hereby declare that the following is a full, clear, and exact description of the construction and operation of the same, reference being had to the accompanying drawings, making a part of this specification, in which—

Figure 1 is a top view of a reaper with my improved rake attached. Fig. 2 is a side elevation of the same, and Fig. 3 a perspective view of one of the rakes detached.

Like letters in the different parts of the drawings represent like parts.

My invention consists of one or more automatic rakes, operated by an endless-chain gearing located at the rear of the platform and driven by a wheel attached on the end of the main driving-wheel's shaft, the rakes being caused to move in a straight line from one end to the other of the platform, and returned again by means of the endless-chain gearing, or equivalent, and a guide-bar, and the platform being provided with strips or cleats to facilitate the operation of the rakes.

To enable others skilled in the art to make and use my invention, I will proceed to describe its construction and operation.

The rakes A are about three (3) feet long, made of scantling, two (2) inches thick and four (4) inches wide, and provided with four (4) or more suitable teeth, $a\ a\ a\ a$, and with a sloping back, $b$, to allow the grain which may fall on it to slide off, and with brace-rod $c$ and clevises $d\ d$.

On the rear of the platform is constructed a suitable carriage and support, B, for the endless chain C, which is made of broad flat links, and works like a belt on the two notched wheels D E, the links of the chain fitting in the notches of the wheels, so that it cannot slip.

Under the wheel E, and attached to the same axle, is a smaller wheel, F, around which works the endless chain or belt $e$, which passes under the pulley $f$ and around wheel G on the end of the shaft of the main driving-wheels H H. On the other end of this shaft is attached wheel I, carrying belt $g$, which passes over pulleys $h\ h$ and around wheel K, which is attached to the shaft of the reel L, which is supported by arms $m\ m$, suitably attached to the main timbers of the reaper.

Fastened by screws or bolts to the platform is a guide-bar, $k$, curved so as to encircle both ends, and extending the whole length of the endless chain in the rear and above the same. Upon this bar the rakes, after discharging the grain from the platform, are raised and moved to the other end.

The clevises are made of rod-iron, bent in shape of the letter U, with ends flattened, and are fastened by screws or bolts to the rakes and attached to the endless chain through the eyes $s\ s$, which are made large enough to allow the clevises to slip in and out readily.

To prevent the rake-teeth from gliding over the grain, and to make it slip more readily in front of the rakes, three or four strips or cleats, $n\ n\ n$, with raised curved ends, are fastened proper distances apart, corresponding with distances between the teeth on the front part of the platform, parallel therewith and with each other. The ends are curved to correspond with the direction of the rakes in starting upon and leaving the platform, the left ends being raised, so as to cause the grain to slide down a little space from the end of the platform, so that the rake will not pass over any of the grain, and the other ends being raised to prevent the grain from sliding off in front of the rake until pressed closely together and forced off in bunches ready for binding.

In order that the bunches may always be the proper size for sheaves, two or more rakes may be used when the grain is heavy, the rakes being readily attached and removed by unscrewing or unbolting the clevises; or the sizes of the bunches may be regulated by the size of wheels to be used in place of G and H, so as to cause the rake to move slower or faster, as may be required.

On the left end of the endless-chain carriage B is attached a beveled block or cap, $t$, upon which the lower end of the rake slides up as it passes around the curve of the bar, and which aids in tipping the rake and causing it to fall in proper position on the platform.

Operation: As the grain is cut it falls across the strips $n$, and the forward motion of the reaper operates the endless chain, which carries the rake along the platform, the teeth passing between the strips $n$, pushing the grain before it to one end, and forcing it off in bunches ready for binding. The rake is then caused to slide up on the curved bar $k$ to an upright position, and is moved along in that position to the other end, sliding on the bar and around the curve to the platform again in raking position, the end of the rake sliding up the beveled cap $t$, which aids in tipping the rake over to a horizontal position on the platform.

My improved rake may be attached to and used with any reaping-machine.

Having thus fully described my invention, what I claim therein as new, and desire to secure by Letters Patent, is—

The guide-bar $k$ and beveled block or cap $t$, in combination with rake A and endless chain C, substantially as and for the purpose described.

PHILIP AMMERMAN.

Witnesses:
W. S. HAVILAND,
H. ROWLAND.